United States Patent
Poon

(10) Patent No.: US 7,276,805 B2
(45) Date of Patent: Oct. 2, 2007

(54) MANUAL-POWERED GENERATOR AND ASSEMBLIES THEREWITH

(75) Inventor: Wo Huen Poon, Kowloon (HK)

(73) Assignee: AWA Micro Power Corporation, Kowloon (HK)

( * ) Notice: Subject to any disclaimer, the term of this patent is extended or adjusted under 35 U.S.C. 154(b) by 0 days.

(21) Appl. No.: 11/350,536

(22) Filed: Feb. 9, 2006

(65) Prior Publication Data

US 2006/0197477 A1    Sep. 7, 2006

Related U.S. Application Data

(60) Provisional application No. 60/651,365, filed on Feb. 9, 2005.

(51) Int. Cl.
F02B 63/04     (2006.01)
F02B 67/04     (2006.01)
H02K 7/10      (2006.01)

(52) U.S. Cl. .................. 290/1 E; 290/1 C; 310/75 B

(58) Field of Classification Search ............... 290/1 C, 290/1 E, 1 R; 310/75 B, 83, 75 A
See application file for complete search history.

(56) References Cited

U.S. PATENT DOCUMENTS

| | | | | |
|---|---|---|---|---|
| 407,327 A | * | 7/1889 | Buell | 310/69 |
| 1,015,298 A | * | 1/1912 | Cleland | 185/39 |
| 1,131,063 A | * | 3/1915 | Klemmer | 310/75 B |
| 2,322,067 A | * | 6/1943 | Soreny | 396/185 |
| 2,390,877 A | * | 12/1945 | Fisher | 310/156.08 |
| 2,628,338 A | * | 2/1953 | Gould | 310/68 A |
| 3,573,479 A | * | 4/1971 | Rieth | 290/1 E |
| 3,633,106 A | * | 1/1972 | Willis | 340/308 |
| 4,287,428 A | * | 9/1981 | Smith | 290/1 E |
| 5,684,345 A | * | 11/1997 | Suttner | 310/41 |
| 6,125,636 A | * | 10/2000 | Taylor et al. | 62/3.5 |
| 6,199,674 B1 | * | 3/2001 | Liao | 191/12.4 |
| 6,291,900 B1 | * | 9/2001 | Tiemann et al. | 290/1 A |
| 6,588,918 B1 | | 7/2003 | Millar | |
| 6,858,951 B2 | * | 2/2005 | Liao | 290/1 C |
| 7,109,594 B2 | * | 9/2006 | Liao | 290/1 C |

FOREIGN PATENT DOCUMENTS

| | | |
|---|---|---|
| DE | 4312074 A1 | 10/1994 |
| GB | 2324144 A | 10/1998 |

(Continued)

*Primary Examiner*—Julio C. Gonzalez
(74) *Attorney, Agent, or Firm*—Leydig, Voit, & Mayer, Ltd

(57) ABSTRACT

The invention provides a manually-powered electrical assembly. In one aspect, the manually-powered electrical assembly can be a light assembly that comprises a light source, an electrical generator, and a manual actuator assembly. The electrical generator is electrically connected to the light source and is operable to provide an electric current to the light source to operate the light source for providing light. The manual actuator assembly is arranged with the electrical generator for selectively manually operating the electrical generator. The manual actuator assembly includes an operator handle movable over a range of travel between a normal position and an operated position, a biasing mechanism for biasing the operator handle to the normal position, and a drive train connected to the operator handle and the electrical generator for rotating the rotor of the electrical generator. The invention is operable to power other electrical devices such as a mobile phone or a fan.

10 Claims, 23 Drawing Sheets

FOREIGN PATENT DOCUMENTS

| | | |
|---|---|---|
| GB | 2329958 A | 4/1999 |
| GB | 2332268 A | 6/1999 |
| GB | 2353854 A | 3/2001 |
| JP | 2003092001 A | 3/2003 |
| WO | WO93/12375 A1 | 6/1993 |
| WO | WO98/05900 A1 | 2/1998 |

* cited by examiner

MANUAL-POWERED GENERATOR AND ASSEMBLIES THEREWITH

CROSS-REFERENCE TO RELATED PATENT APPLICATION

This patent application claims the benefit of priority to U.S. Provisional Application No. 60/651,365, filed Feb. 9, 2005, and entitled "Manual-Powered Generator And Assemblies Therewith," which is incorporated in its entirety herein by this reference.

FIELD OF THE INVENTION

This invention pertains to manual-powered generators, and more particularly to manual-powered generators for powering relatively small electronic devices.

BACKGROUND OF THE INVENTION

In the event of an electrical power outage, for example, an alternative source for electricity is often desirable, particularly for providing illumination. Often in such a situation, batteries for flashlights are not on hand or no longer provide a charge. Generators can be relatively large and inconvenient for use with small devices.

BRIEF SUMMARY OF THE INVENTION

The invention provides a manual-powered generator for powering relatively small electronic devices. In one embodiment, the invention is in the form of a light assembly. The light assembly comprises a light source, an electrical generator, and a manual actuator assembly. The electrical generator is electrically connected to the light source and is operable to provide an electric current to the light source to operate the light source for providing light. The electrical generator has a rotor. The manual actuator assembly is arranged with the electrical generator for selectively manually operating the electrical generator. The manual actuator assembly includes an operator handle movable over a range of travel between a normal position and an operated position, and a drive train connected to the operator handle and the electrical generator for rotating the rotor of the electrical generator. The operator handle has a rotatably movable shaft. The biasing mechanism has a reel mounted to the shaft of the operator handle and a tape spring for rotationally biasing the reel to rotate in a return direction. The tape spring is wound on the reel and connected such that when the operator handle is moved in an operating direction toward the operated position, the reel rotates in a forward direction and the tape spring develops a return force. The return force urges the reel and the shaft of the operating handle to move in a return direction. The return direction opposes the forward direction. The drive train includes a plurality of gears, one gear of the drive train being mounted to the shaft of the operating handle and another gear being mounted to the rotor of the electrical generator. In other embodiments, the invention is useful for powering other electrical devices, such as a mobile phone or a fan, for example.

The features of the present invention will become apparent to one of ordinary skill in the art upon reading the detailed description, in conjunction with the accompanying drawings, provided herein.

DETAILED DESCRIPTION OF THE INVENTION

Figure 1:
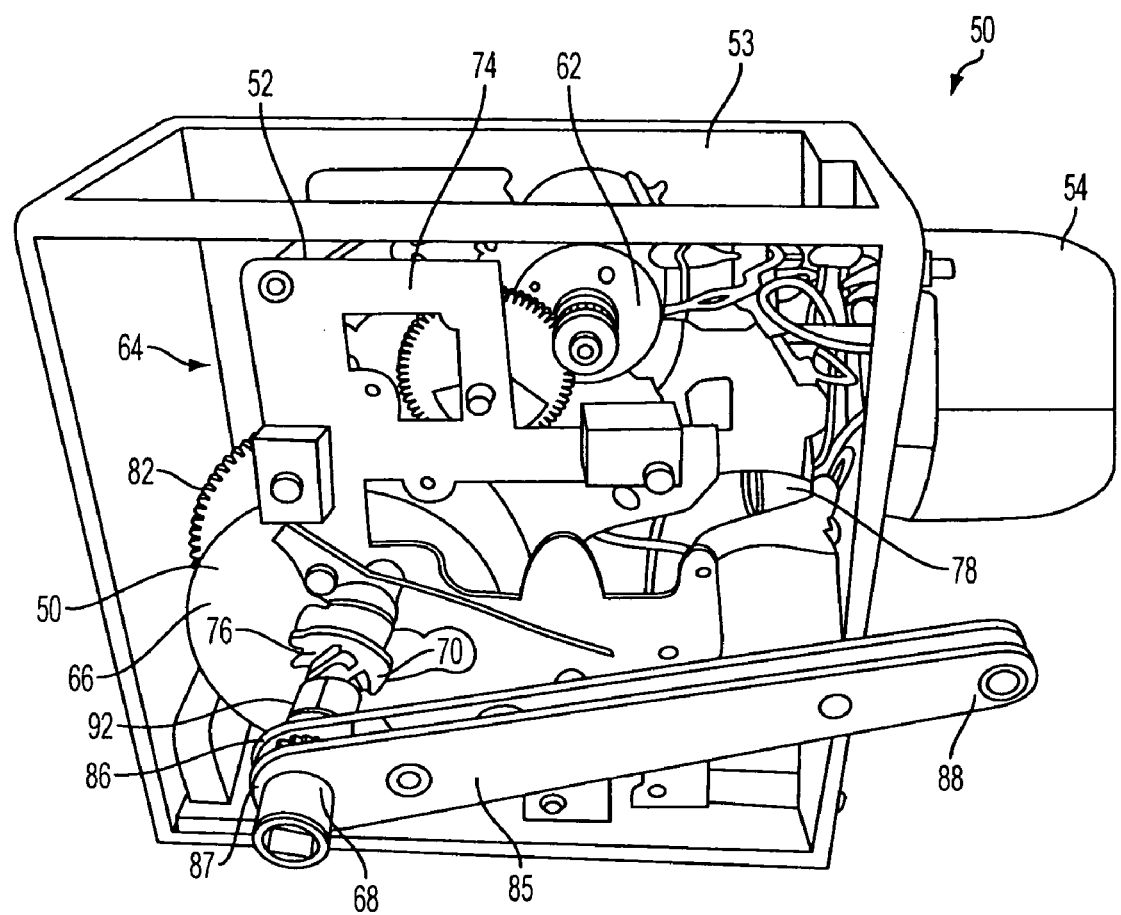
FIG. 1 is a perspective side view of a light assembly in accordance with the teachings of the present invention, the light assembly comprising a manual-powered generator and a light source.

Turning now to the drawings, there is shown in FIG. 1, a light assembly 50 according to the present invention including a manual-powered generator device 52 contained within a housing 53 and a light source 54. As shown, the manual-powered generator device 52 comprises a generator 62, a gear train 64, a spring housing 66, a handle 68, a shaft 70, a frame 74, a spring pawl mechanism 76, and a rechargeable battery 78. The handle 68 is coupled to the shaft 70 for rotation of the shaft in an operating direction. The spring pawl mechanism 76 is operably arranged with the shaft 70 to prevent the shaft from rotating in a direction opposite the operating direction. The spring housing 66 is connected to the shaft 70 such that a tape spring within the spring housing 66 is wound upon rotational movement of the shaft in the operating direction. The spring housing 66 is also operably arranged with the gear train 64 for providing rotational movement of the gear train when the tape spring is unwound. The gear train 64 in turn, is operably arranged with the generator 62 such that the rotational movement of the gear train is converted to electricity by the generator. The generator 62 is electrically connected to the light source 54 for providing electricity thereto. In one embodiment, as shown, the light source 54 is mounted to the housing 53. The frame 74 is used to mount and support components of the manual-powered generator device 52. The housing 53 is provided to contain and protect components of the manual-powered generator device 52.

The handle 68 is operated by a user to rotate the shaft 70, which in turn rotates a portion of the spring housing 66. A main gear 82, attached to the spring housing 66, is rotated when the spring housing 66 is rotated. The main gear 82 acts upon the gear train 64. The gear train 64 applies rotational force to the generator 62 to generate electricity.

Figure 3:
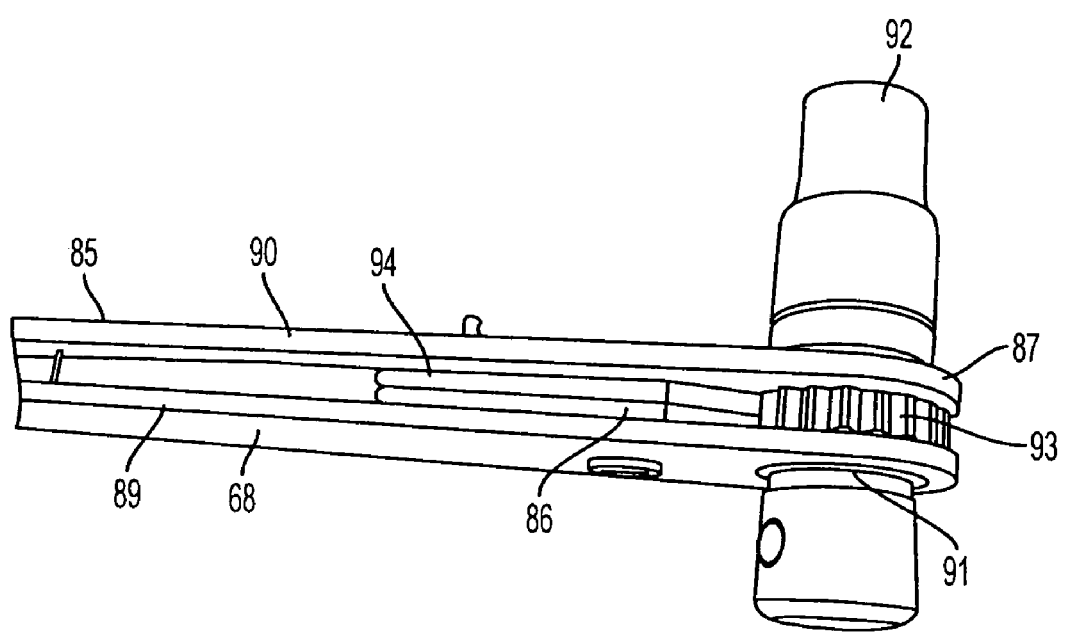
FIG. 3 is a fragmentary top perspective view of a handle unit of the manual-powered generator of FIG. 1.

Referring to FIGS. 1 and 3, the handle 68 includes an elongate lever 85 with a handle pawl mechanism 86 disposed at a distal end 87 thereof. The lever 85 extends a predetermined distance such that an operator end 88 thereof is located at a convenient point for use by an operator to operate the manual-powered electric generator device 52. Referring to FIG. 3, the lever 85 includes a pair of arms 89, 90 which are in spaced relationship to each other at the distal end 87 of the lever 85. A shaft 91 extends transversely through the distal end 87 of the lever 85 and has a socket 92 secured thereto. The handle pawl mechanism 86 is disposed between the arms 89, 90 of the lever 85 at the distal end 87. A ratchet gear 93 of the pawl mechanism 86 is secured to the shaft 91. A pawl 94 of the handle pawl mechanism 86 is pivotally mounted to at least one of the arms 89, 90 such that the pawl 94 is operably engageable with the ratchet gear 93. One of the arms 90 includes a biasing member to prevent the pawl 94 from rotating in one direction, but urging the pawl 94 to rotate in the other direction to engage the ratchet gear 93. The socket 92 is configured so that it can be coupled to the shaft so as to transmit rotational movement of the handle 68 to the shaft 70 (shown in FIG. 1).

In operation, the handle 68 rotates the socket 92 (and thus the shaft 70) via the handle pawl mechanism 86 when the handle 68 is moved in one direction, i.e. the operating direction. When the handle 68 is moved in the operating direction, the pawl 94 engages the ratchet gear 93 to thereby rotate the shaft 91, along with the socket 92. When the handle 68 is moved in the opposite direction, i.e., the return direction, the pawl 94 disengages from the ratchet gear 93, thereby allowing the lever 85 to rotate with respect to the shaft 91 such that the lever 85 can be moved in the return direction without rotation of the socket 92.

Figure 2:
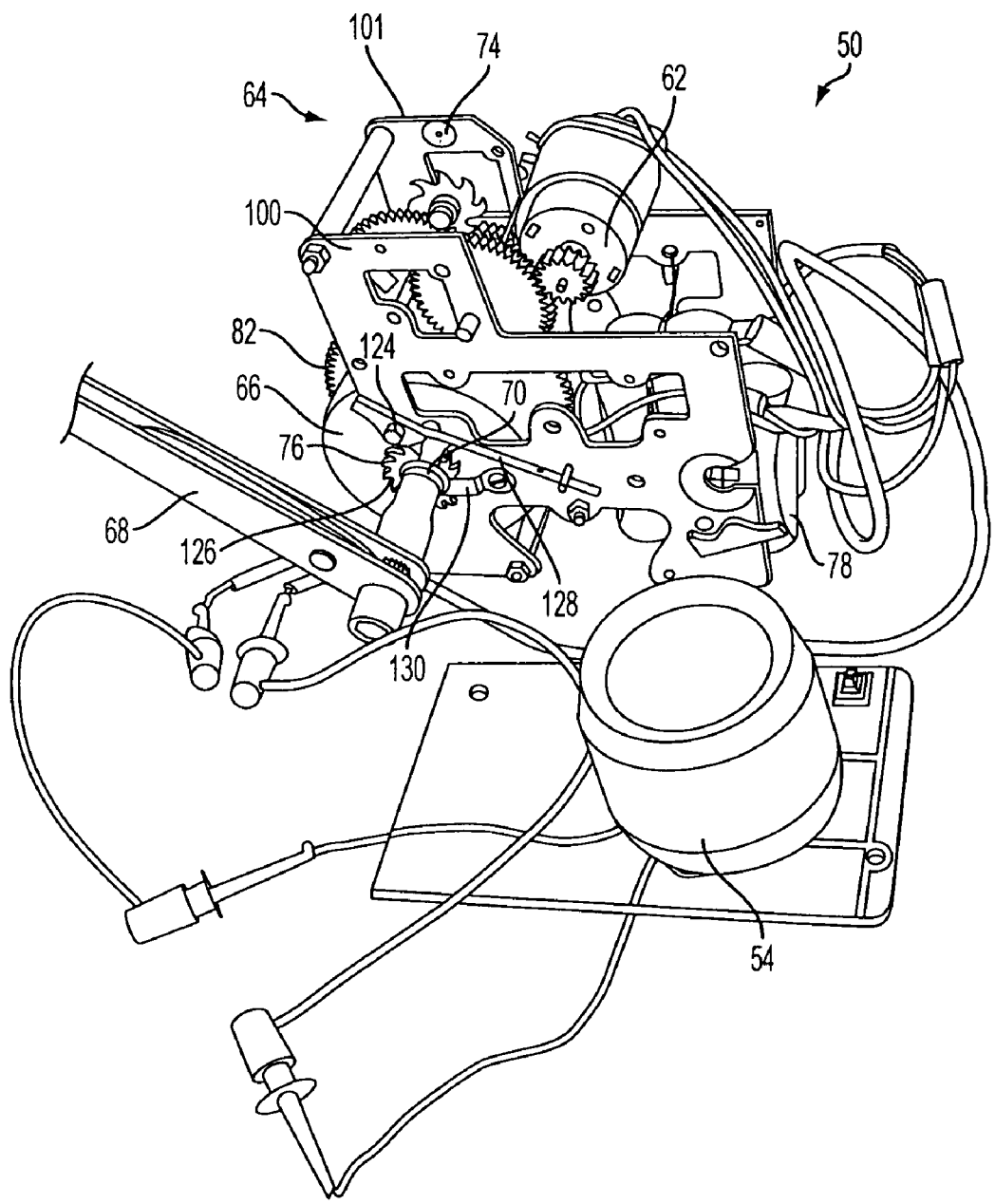
FIG. 2 is another perspective view of the light assembly of FIG. 1 with a housing thereof removed for illustrative purposes.

Referring to FIG. 2, the frame 74 comprises a pair of plates 100, 101 disposed in spaced relationship to each other with the spring housing 66, the gear train 64, and the generator 62 disposed between the plates 100, 101. There is space within the frame 74 to accommodate the rechargeable battery/rechargeable battery pack 78.

Figure 4:
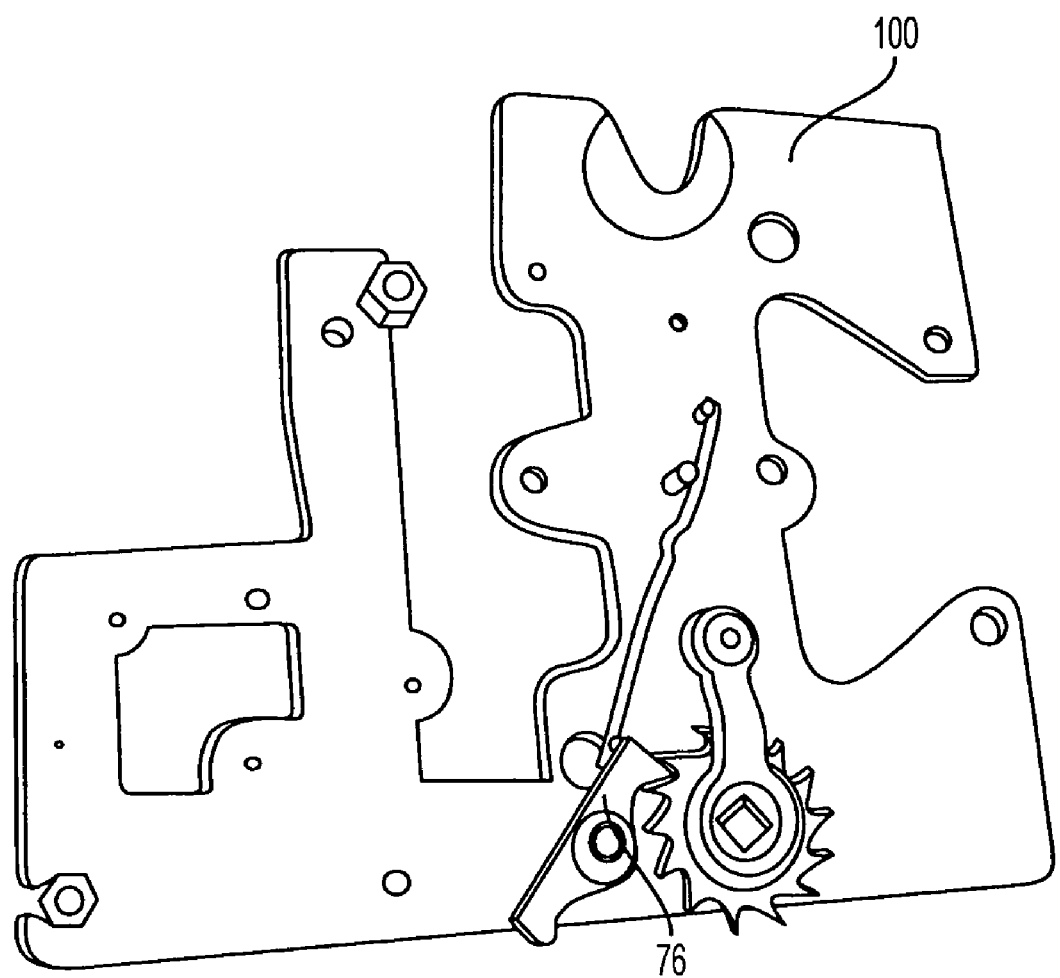
FIG. 4 is a perspective view of a first side of a frame plate of the manual-powered generator of FIG. 1.

Referring to FIG. 4, the first plate 100 is similar to the second plate. The first plate 100 supports the spring pawl mechanism 86.

Figure 5:
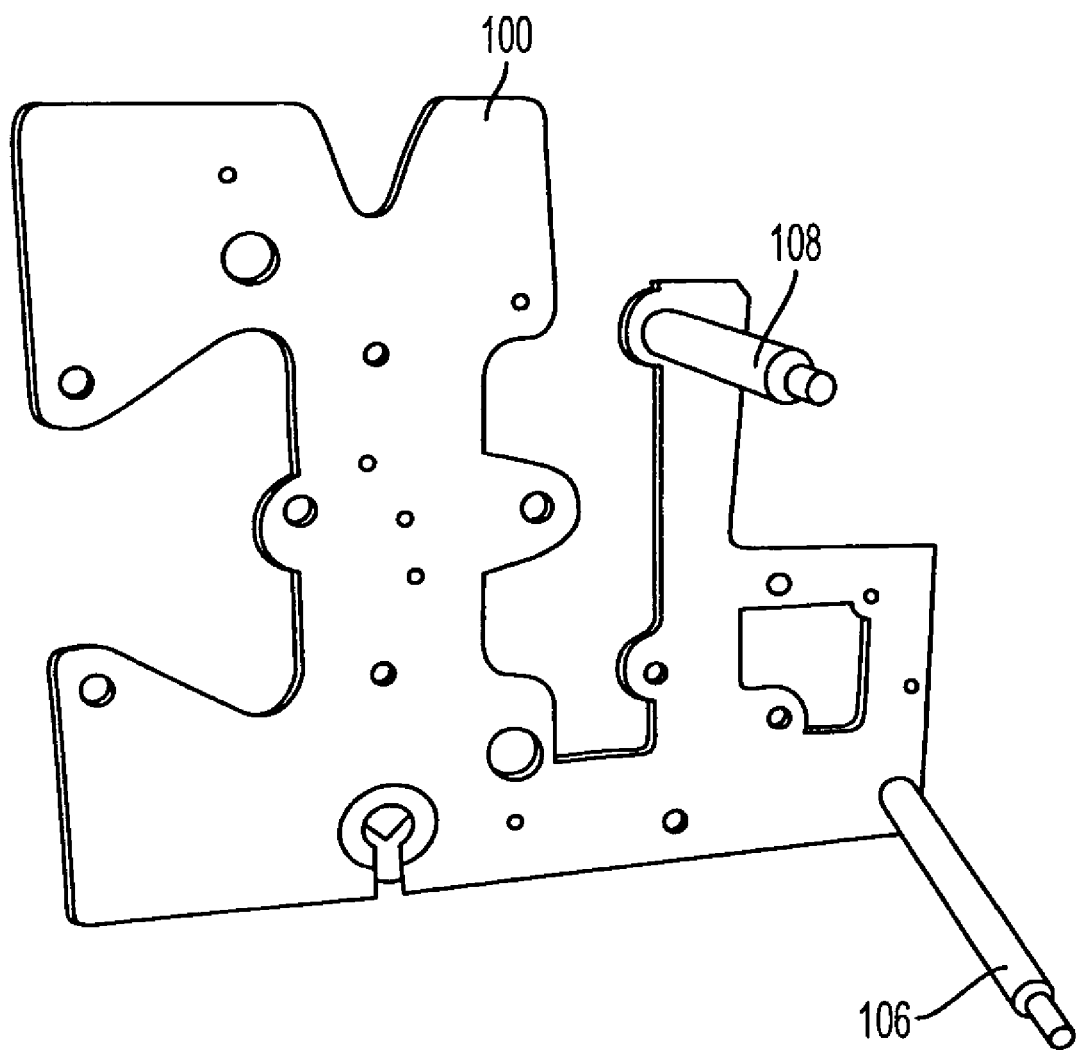
FIG. 5 is a perspective view of a second side of the frame plate of FIG. 4.

Referring to FIG. 5, a pair of connecting rods 106, 108 are secured to the plate 100. The connecting rods 106, 108 can secure the plates 100, 101 together and support various components of the light assembly 50, as shown in FIG. 2.

Figure 6:
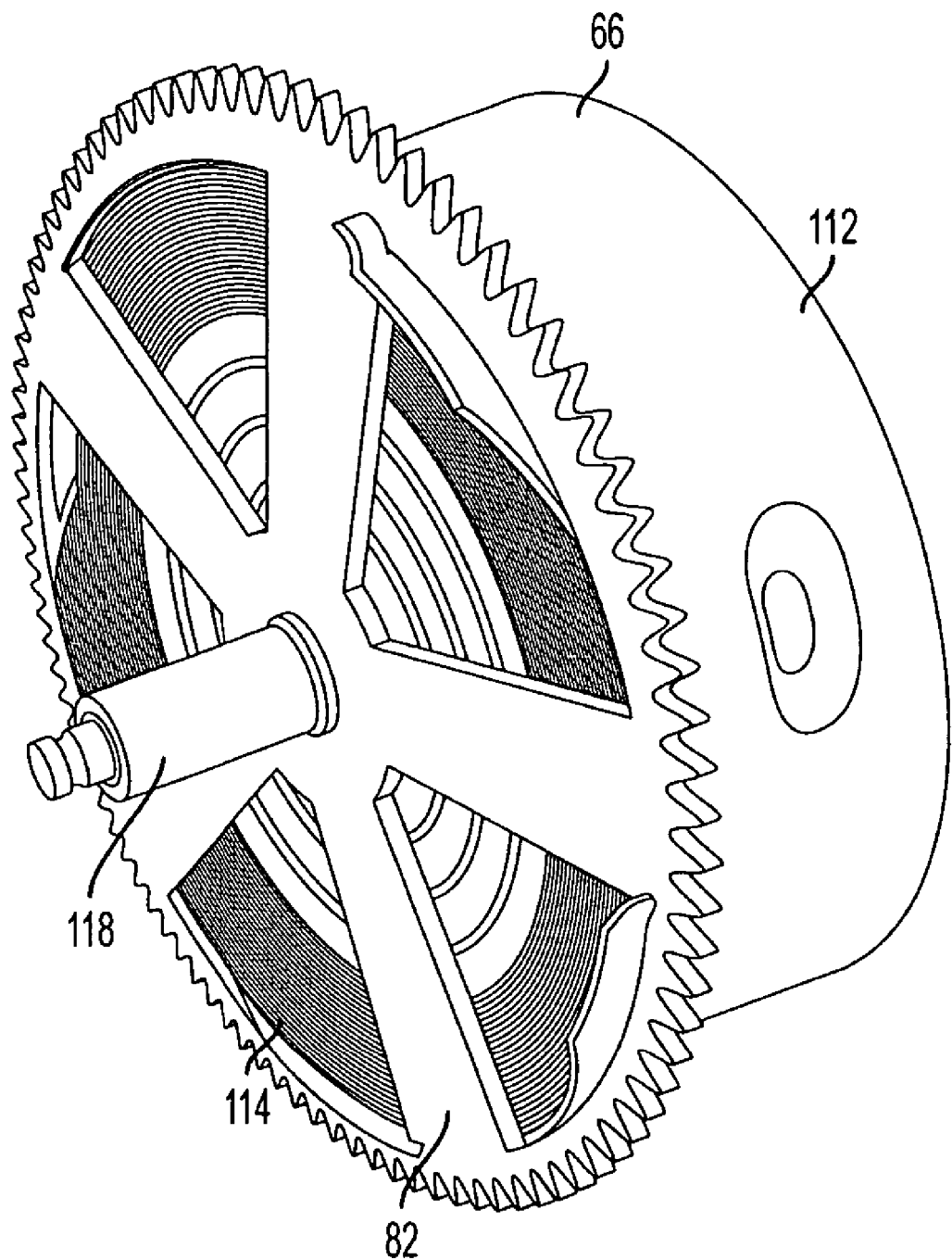
FIG. 6 is a perspective view of a spring housing of the manual-powered generator of FIG. 1.

Referring to FIG. 6, the spring housing 66 includes a reel 112, a tape spring 114 disposed within the reel 112, the main gear 82 secured to the reel 112, and an extension member 118 extending from the main gear 82. The shaft 70 is operably arranged with the spring housing 66, as shown in FIG. 7.

Figure 7:
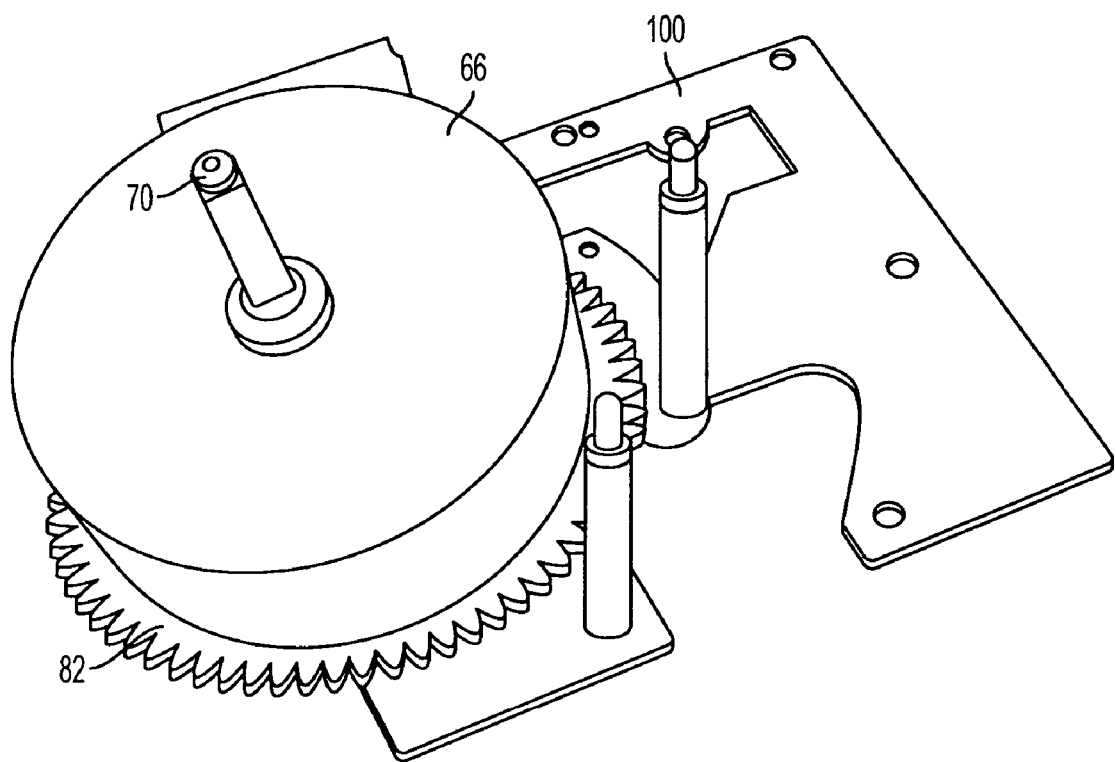
FIG. 7 is another perspective view of the spring housing of FIG. 6 and a fragmentary perspective view of the frame plate of FIG. 4, showing the spring housing rotatably mounted to the frame plate.

Referring to FIG. 7, the shaft 70 extends from the reel 112 in opposing relationship to the extension member 118. The distal end of the shaft 70 is configured to be insertable within the socket 92 of the handle 68. In other embodiments, the handle can be secured to the shaft by other techniques and can constitute a single component.

Figure 8:
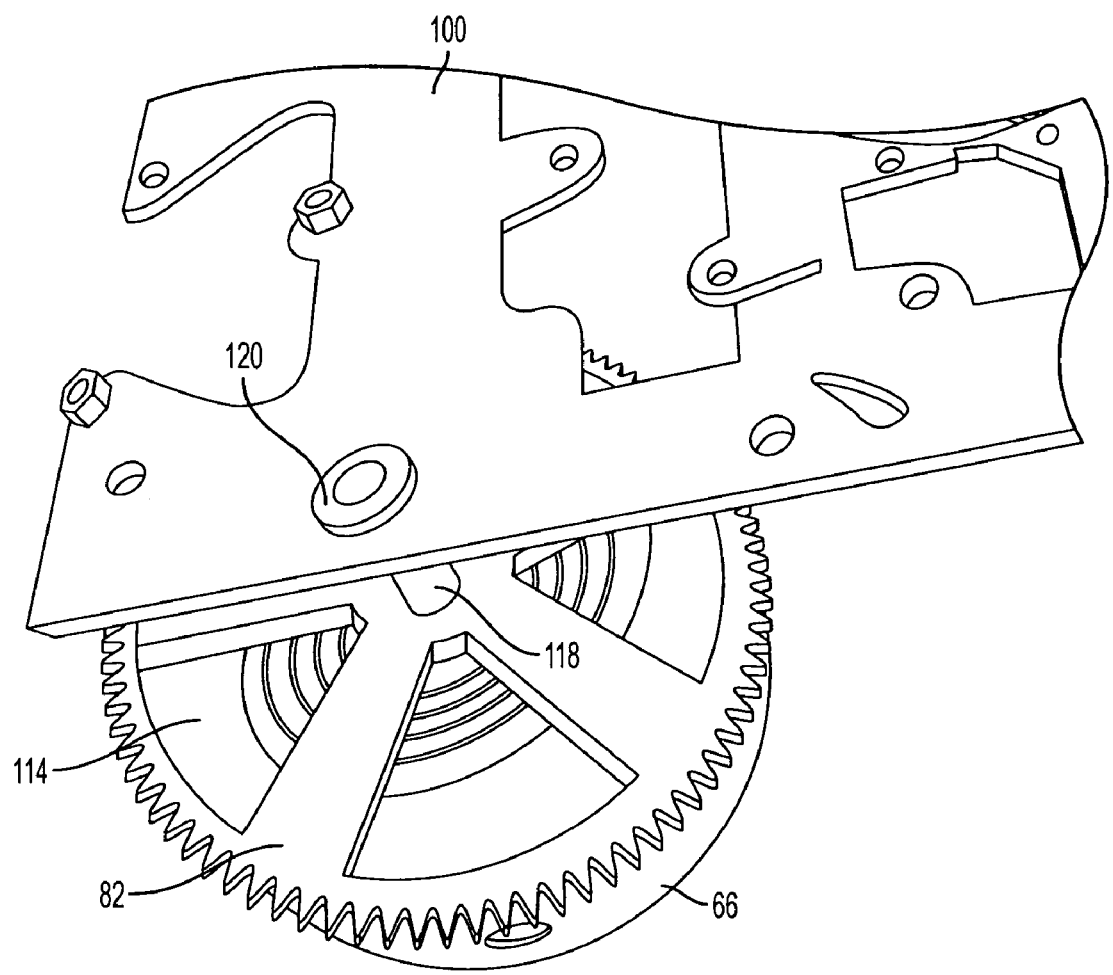
FIG. 8 is a perspective view similar to FIG. 2, but from the second side of the frame plate.

Referring to FIG. 8, the spring housing 66 is supported by one of the plates 100 via the extension member 118. The extension member 118 is rotatably supported within a mounting hole 120 of the plate 100 such that the main gear 82 is free to rotate with respect to the plate 100. An end of the tap spin is connected to the shaft 70.

Referring to FIG. 2, the spring pawl mechanism 76 includes a spring pawl 124 that is engaged with a spring ratchet gear 126. The spring ratchet gear 126 is mounted to the shaft 70. The spring pawl 124 is pivotally mounted to the plate 100. A biasing member 128 is provided to urge the spring pawl 124 into operative engagement with the spring ratchet gear 126. The biasing member 128 is mounted to the first plate 100. A return stop member 130 is mounted to the first plate and is arranged with the spring ratchet gear 126.

The rotation of the shaft 70 in the operating direction winds the tape spring 114 around the reel portion of the shaft 70. The winding of the tape spring 114 creates a spring force, which is exerted against the reel portion of the shaft 70 in the return direction. As mentioned above, the spring pawl mechanism 76 resists this force on the shaft 70, resulting in the tape spring 114 urging the spring housing 66 and the main gear 82 to rotate in the forward direction as the tape spring 114 unwinds.

Figure 9:
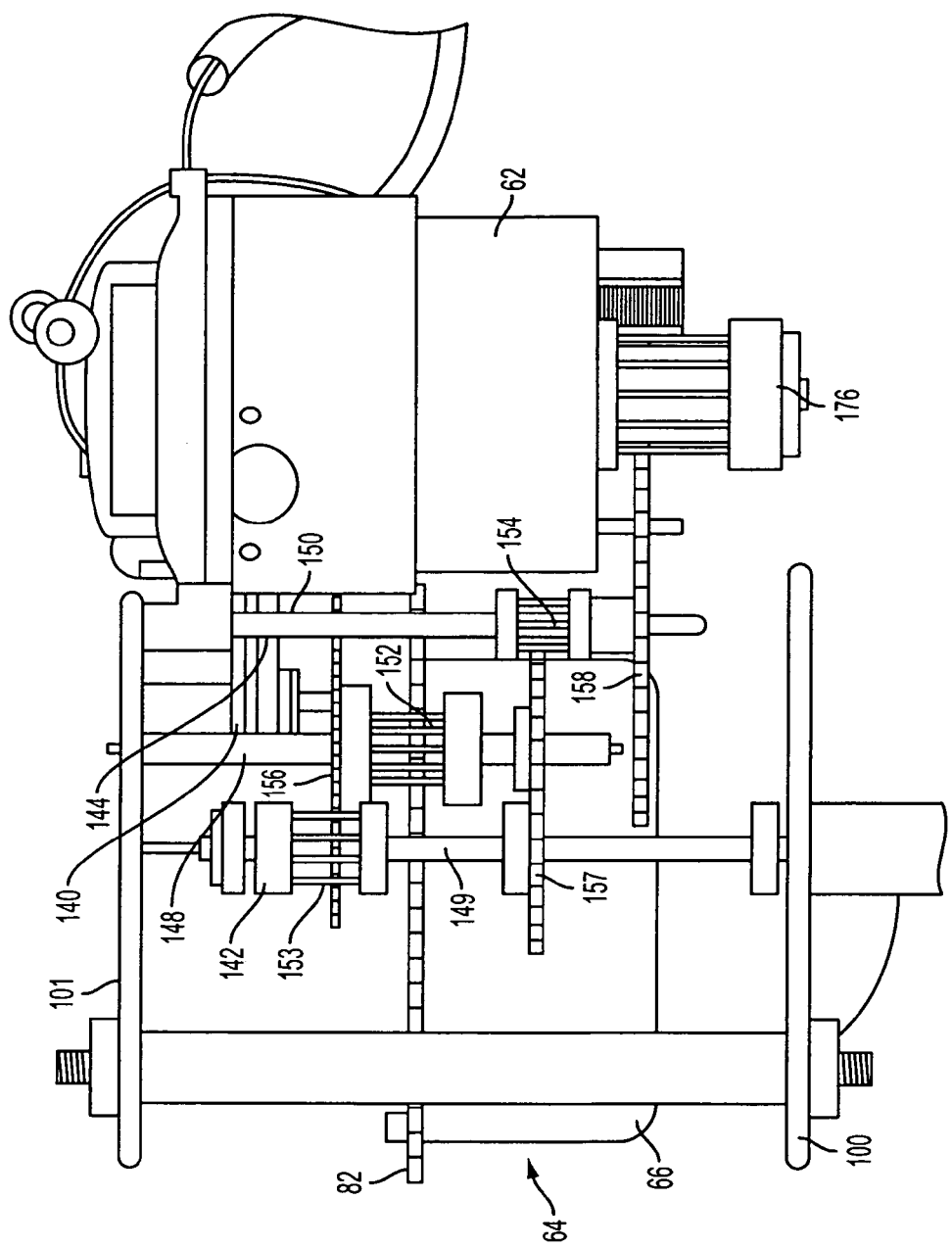
FIG. 9 is a top view of the manual-powered generator of FIG. 1.
Figure 10:
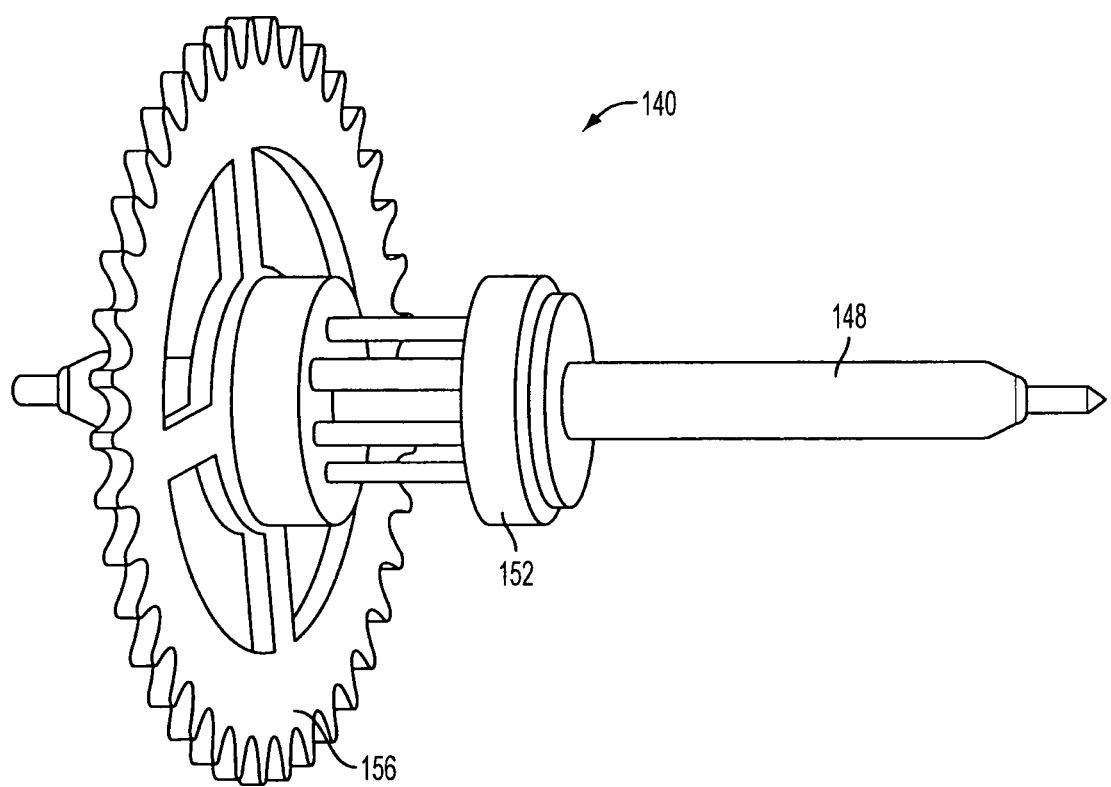
FIG. 10 is a perspective view of a first transfer gear of the manual-powered generator of FIG. 1.
Figure 11:
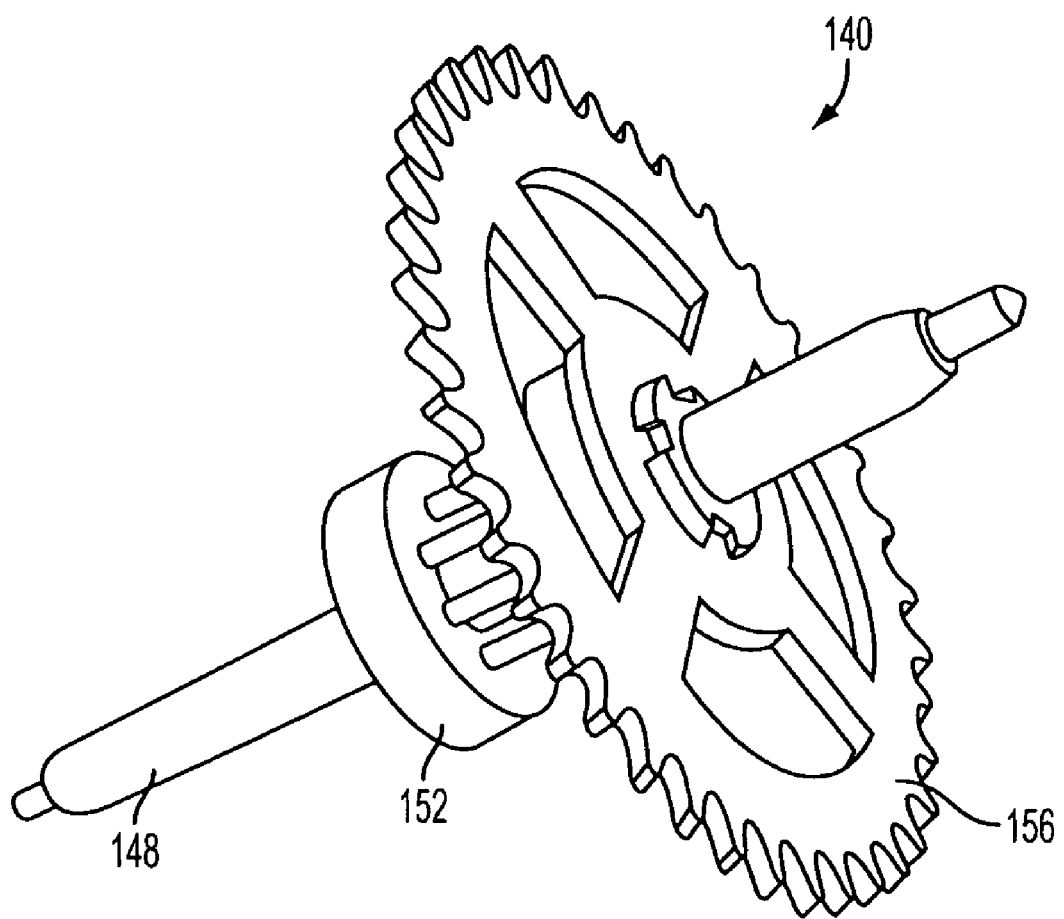
FIG. 11 is another perspective view of the first transfer gear of FIG. 10, but from the opposite side thereof.
Figure 12:
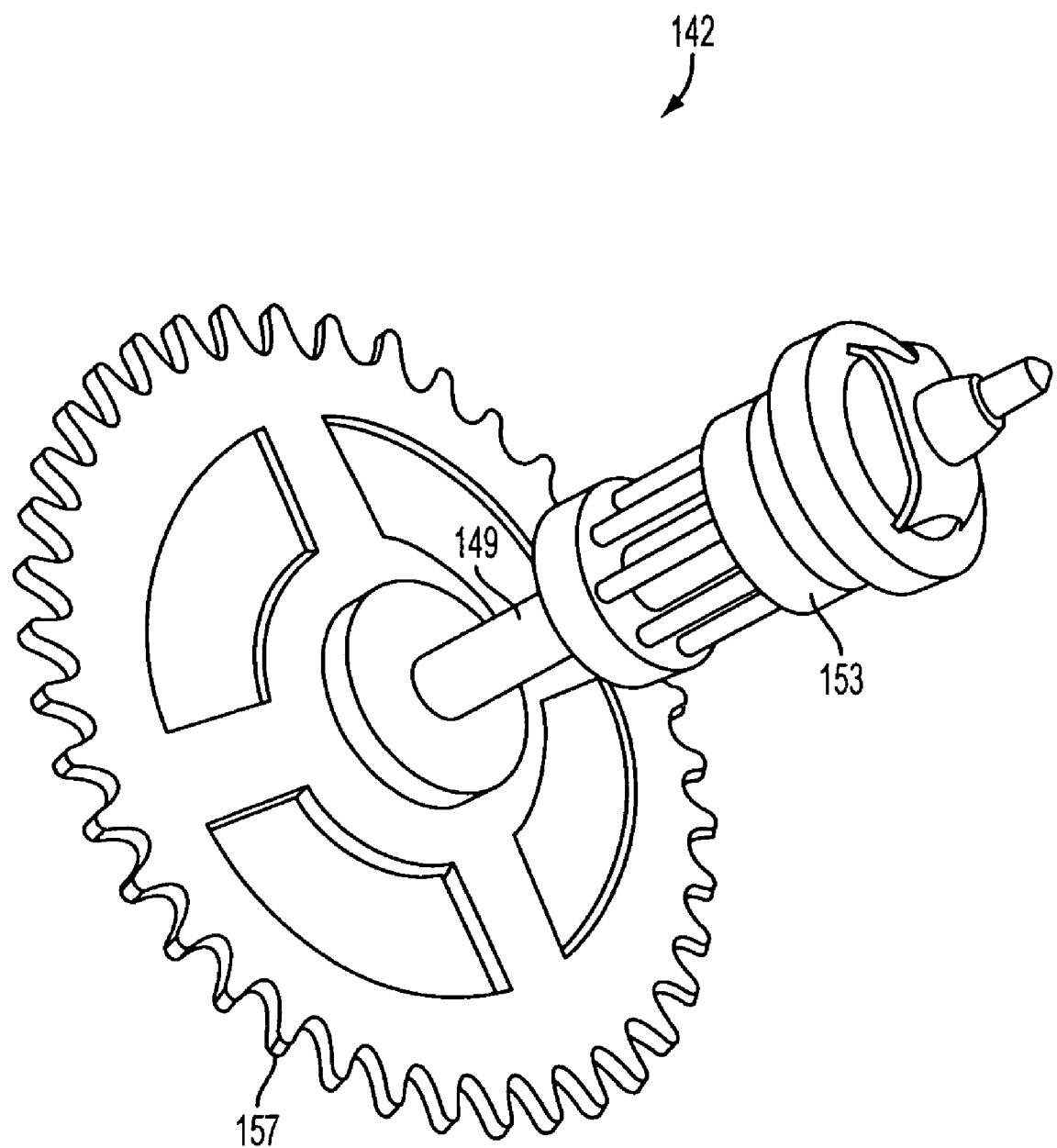
FIG. 12 is a perspective view of a second transfer gear of the manual-powered generator of FIG. 1.
Figure 13:
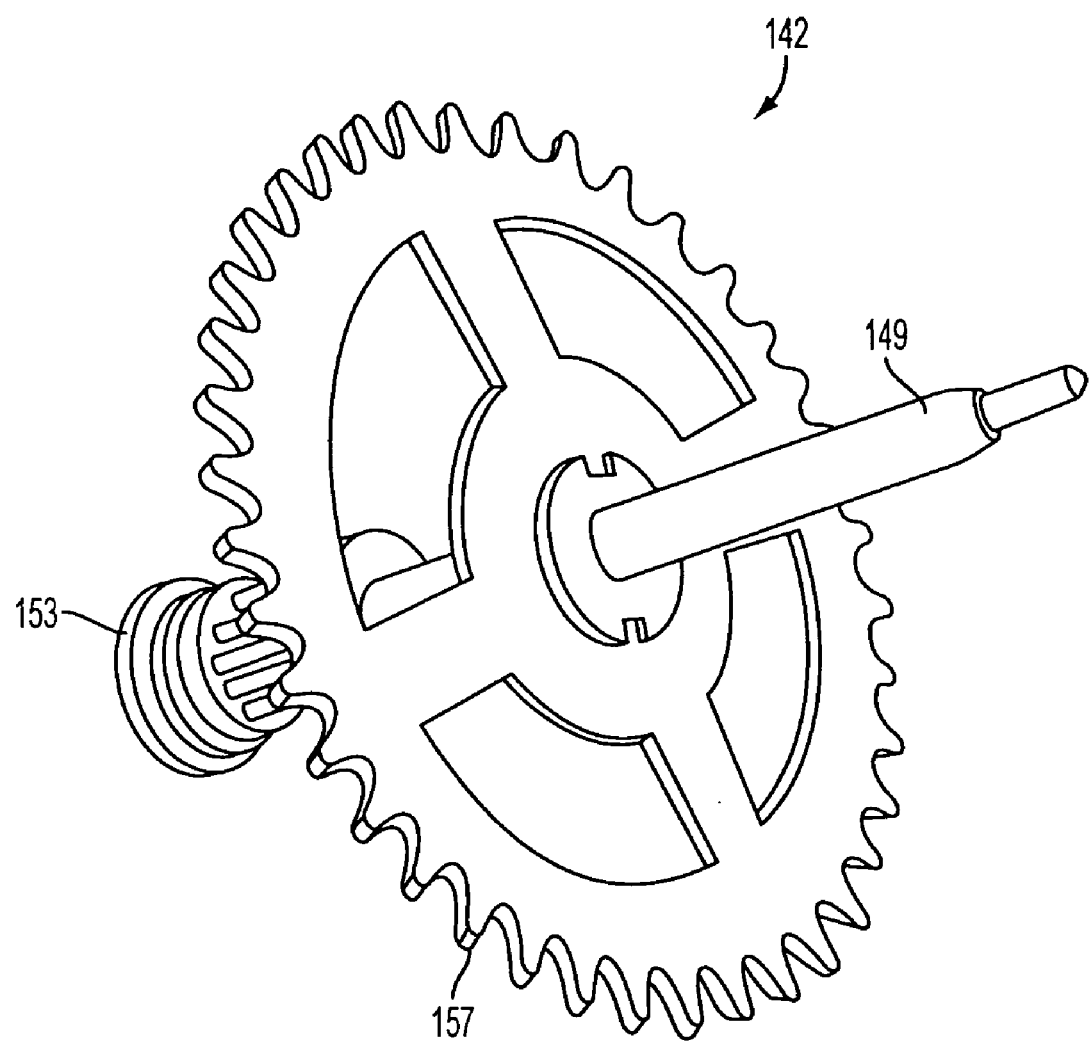
FIG. 13 is another perspective view of the second transfer gear of FIG. 12, but from the opposite side thereof.
Figure 14:
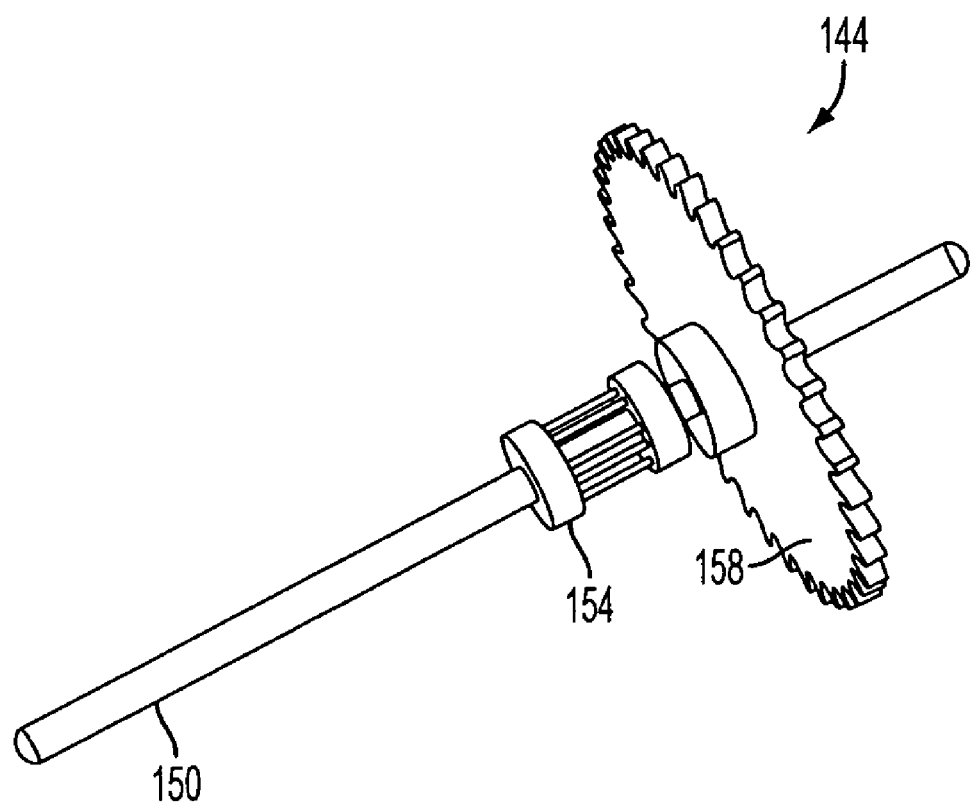
FIG. 14 is a perspective view of a third transfer gear of the manual-powered generator of FIG. 1.

Referring to FIG. 9, the gear train 64 includes three transfer gears 140, 142, 144. The transfer gears 140, 142, 144 transmit rotational force from the main gear 82 to the generator 62. Referring to FIGS. 10-14, each transfer gear 140, 142, 144 includes a shaft 148, 149, 150, a driven gear 152, 153, 154, and a driving gear 156, 157, 158 for transferring rotational force. The driven gear on any of the transfer gears 140, 142, 144 can be a rod combination unit.

Referring to FIG. 9, the shafts 148, 149, 150 of the transfer gears 140, 142, 144 are rotatably mounted to at least one of the plates 100, 101 such that the transfer gears 140, 142, 144 are free to rotate with respect to the plates 100, 101 along an axis defined by each respective shaft. The driven gear 152 of the first transfer gear 140 is operably arranged with the main gear 82 of the spring housing 66 such that rotation of the main gear 82 rotates the first transfer gear 140. The driving gear 156 of the first transfer gear 140 is operably arranged with the driven gear 153 of the second transfer gear 142 such that rotation of the first transfer gear 140 also rotates the second transfer gear 142. The driving gear 157 of the second transfer gear 142 is operably arranged with the driven gear 154 of the third transfer gear 144 such that rotation of the second transfer gear 142 also rotates the third transfer gear 144. The driving gear 158 of the third transfer gear 144 is operably arranged with the generator 62 such that the generator creates electricity when the third transfer gear 144 is rotated.

Figure 15:
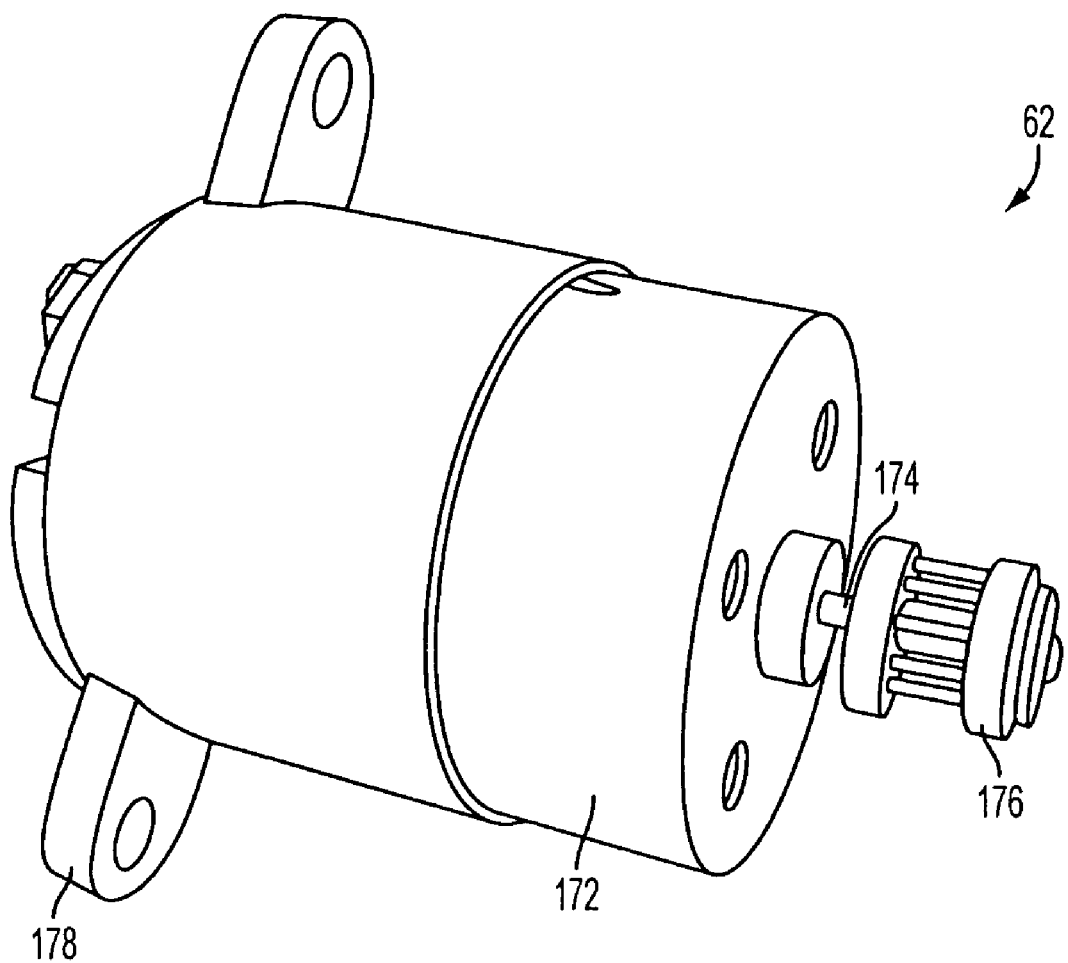
FIG. 15 is a perspective view of a generator of the manual-powered generator of FIG. 1, the generator having a rod-combination driven gear extending therefrom.
Figure 16:
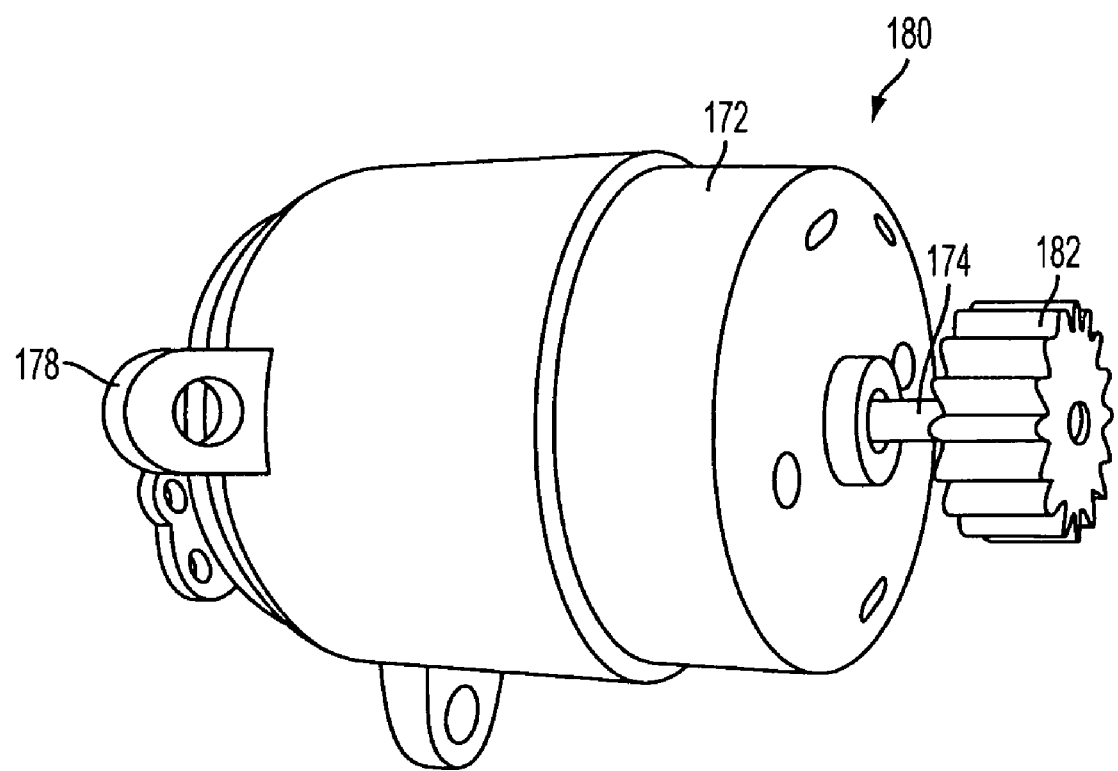
FIG. 16 is a perspective view of a second embodiment of a generator suitable for use with the manual-powered generator of the present invention, the generator having a spur gear extending therefrom.

As shown in FIG. 15, the generator 62 is relatively cylindrical in shape. The generator 62 comprises a body 172, a shaft 174, a driven gear 176, and a bracket 178. The shaft 174 extends from the body 172 with the driven gear 176 disposed at a distal end thereof. The driving gear 158 of the third transfer gear 144 is in operable position with the driven gear 176 of the generator 62 such that when the third transfer gear 144 rotates, the driven gear 176 will rotate the shaft 174 resulting in the generation of electrical energy by the generator 62. The mounting bracket 178 can be used to mount the generator 62 to the second plate 101. As shown in this figure, the driven gear 176 is a rod-combination. In another embodiment of the generator 180, as shown in FIG. 16, the driven gear 182 can be a spur gear.

Figure 17:
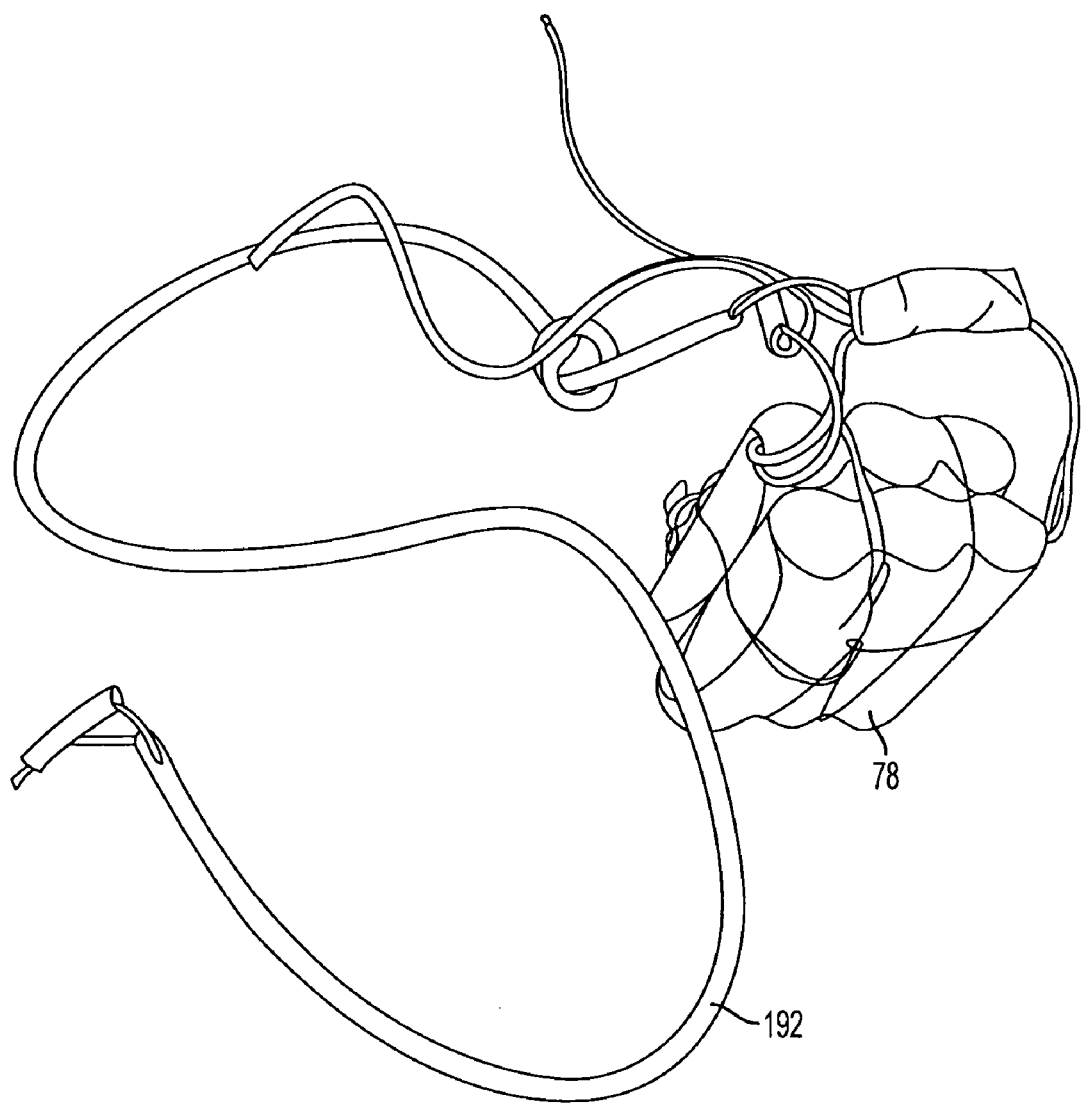
FIG. 17 is a perspective view of a rechargeable battery pack of the light assembly of FIG. 1.

Referring to FIG. 17, the rechargeable battery or battery pack 78 can be connected to the generator such that the electricity created by the generator can be stored and used at a later point in time rather than immediately during operation of the generator. A cable 192 can be used to connect the battery 78 to the generator.

Figure 18:
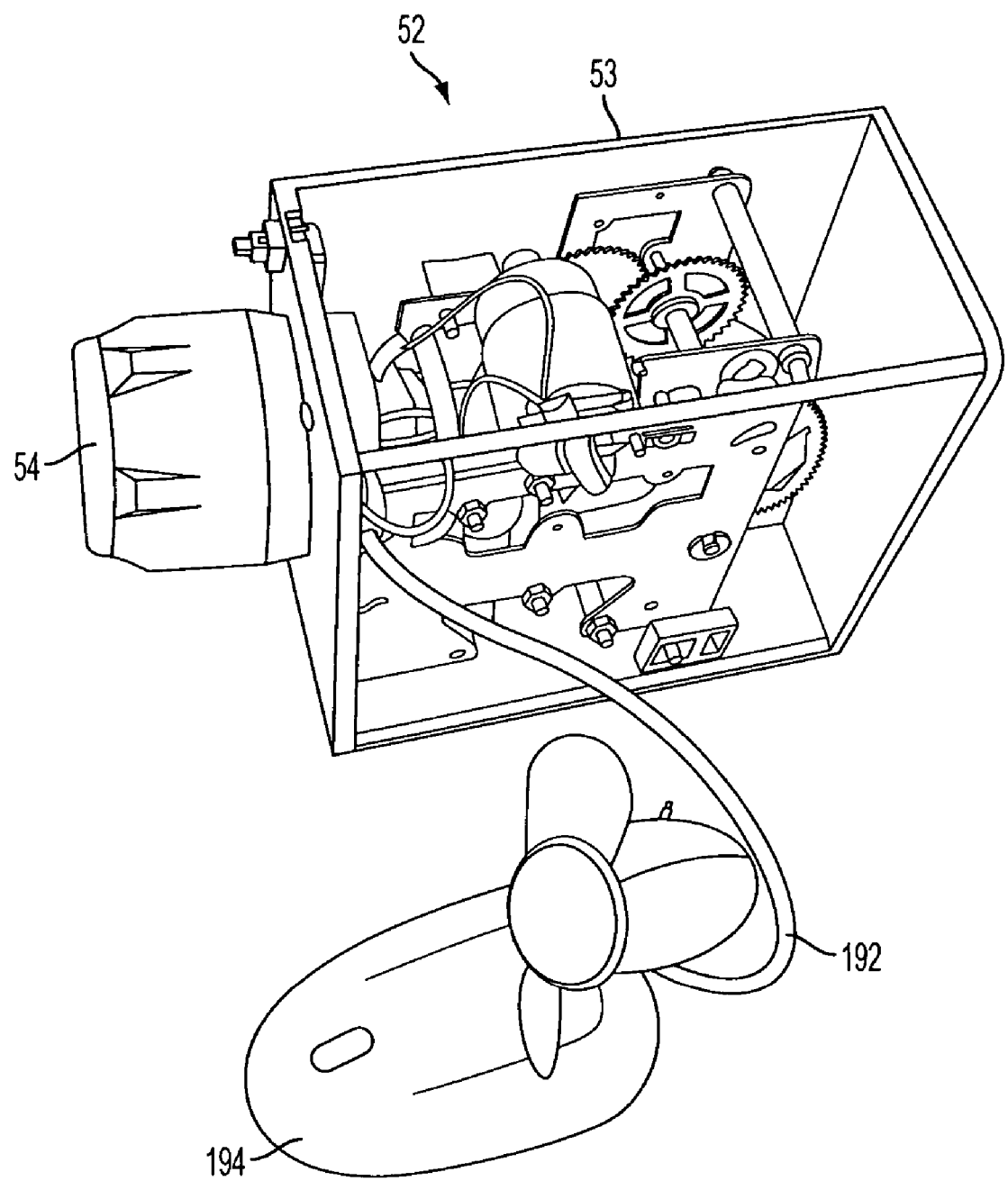
FIG. 18 is another perspective view of the light assembly of FIG. 1 having a fan electrically connected thereto.
Figure 19:
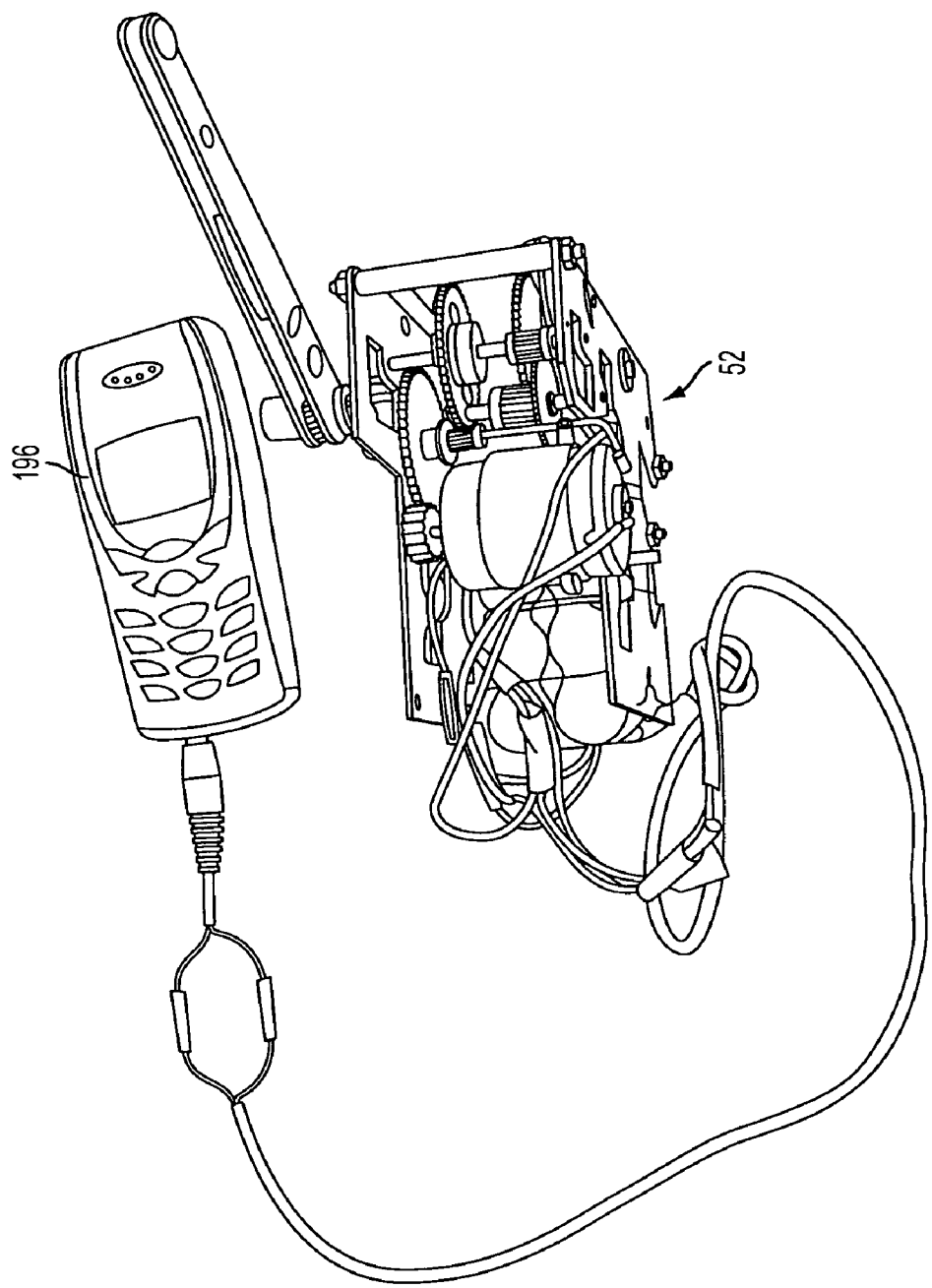
FIG. 19 is a perspective view of a manual-powered generator according to the present invention with a cellular phone electrically connected thereto.
Figure 20:
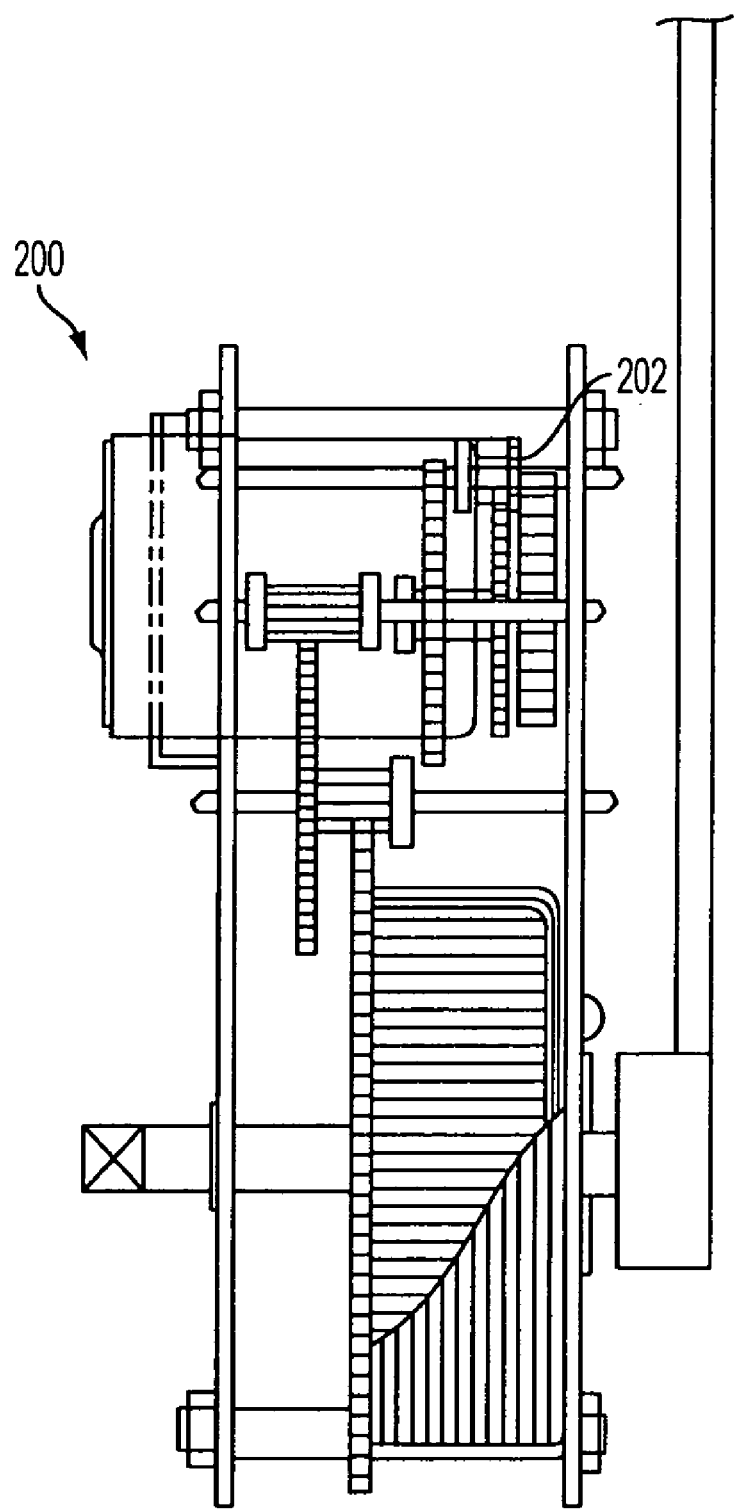
FIG. 20 is a front elevational view of another embodiment of a manual-powered generator in accordance with the teachings of the present invention.

Many types of electrical devices can be powered by the invention. For example, the manual-powered generator can be used to power items such as the light source 54 (shown in FIG. 18), a fan 194 (as shown in FIG. 19), or a mobile phone 196 (as shown in FIG. 20). Additionally, as shown in FIG. 19, the manual-powered generator device 52 can be connected to more than one device at a time, e.g. the assembly can include a light source 54 mounted to the housing 53 and another device such as the fan 194. In yet other embodiments, the manual-powered generator can be used to power any suitable electrically-powered device.

Figure 21:
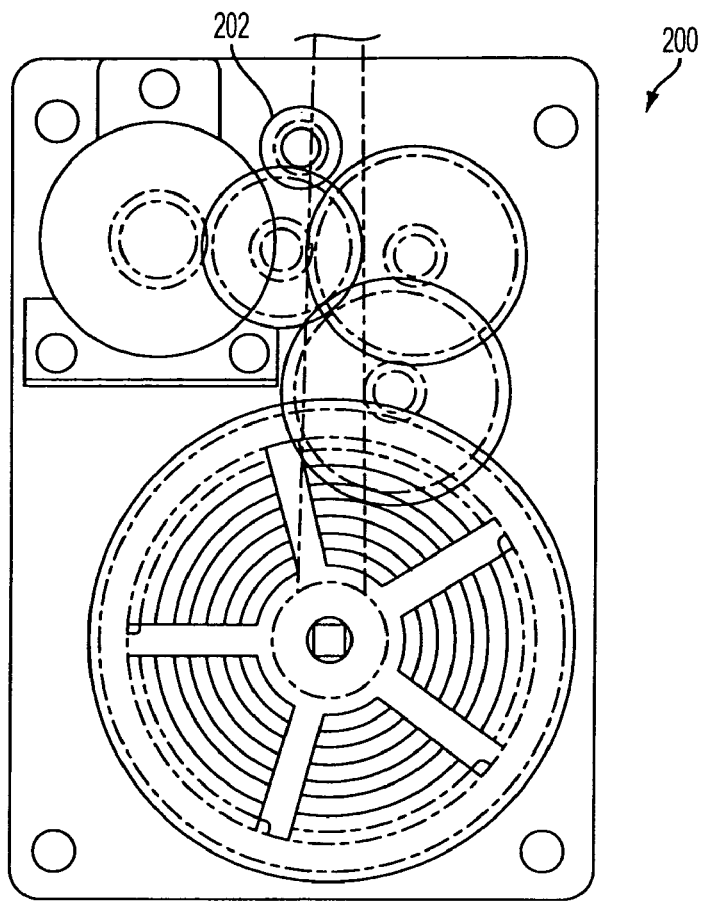
FIG. 21 is a side elevational view of the manual-powered generator of FIG. 21
Figure 22:
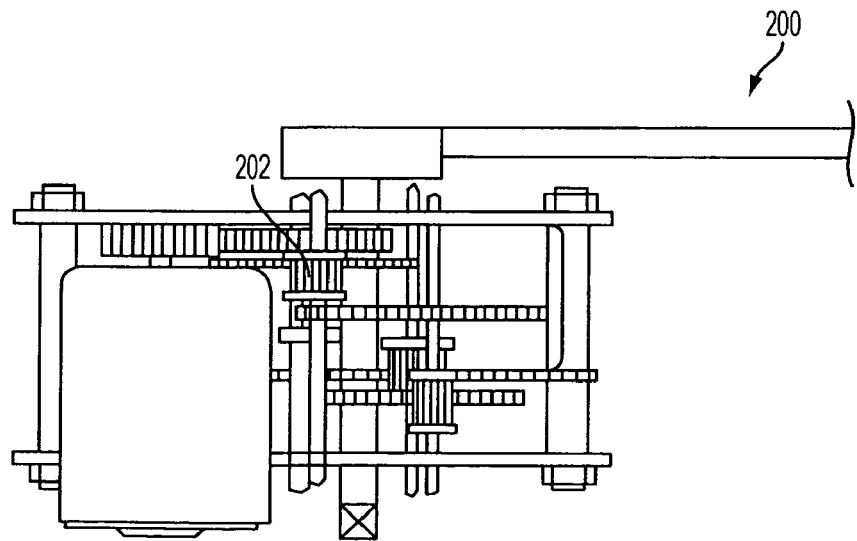
FIG. 22 is a top plan view of the manual-powered generator of FIG. 21.
Figure 23:
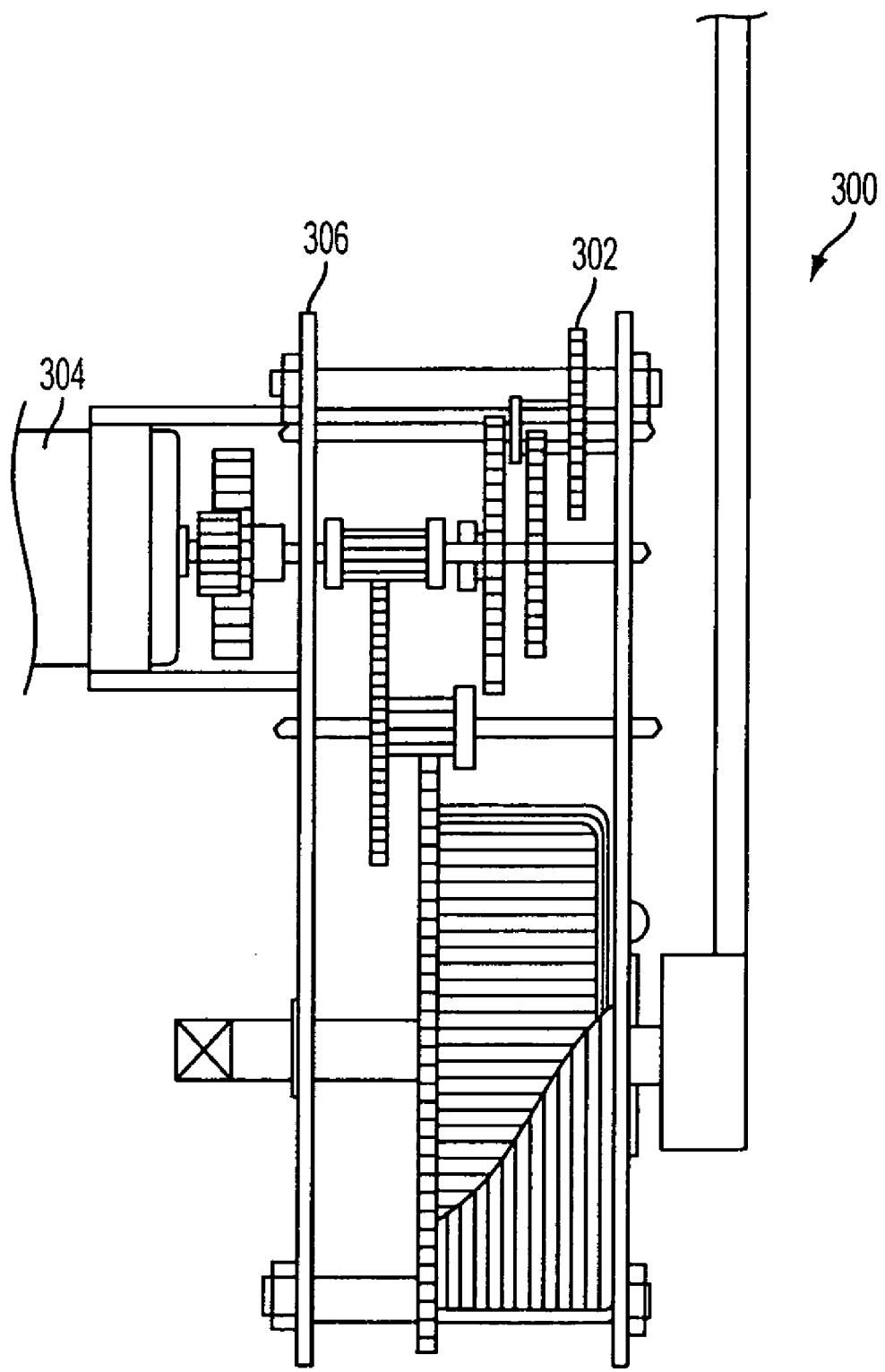
FIG. 23 is a front elevational view of another embodiment of a manual-powered generator in accordance with the teachings of the present invention.
Figure 24:
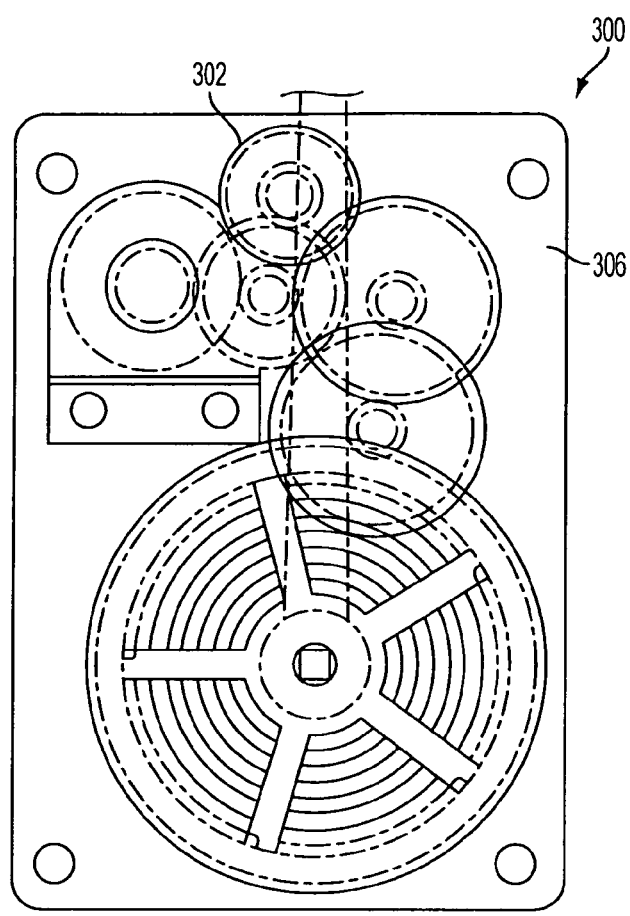
FIG. 24 is a side elevational view of the manual-powered generator of FIG. 24
Figure 25:
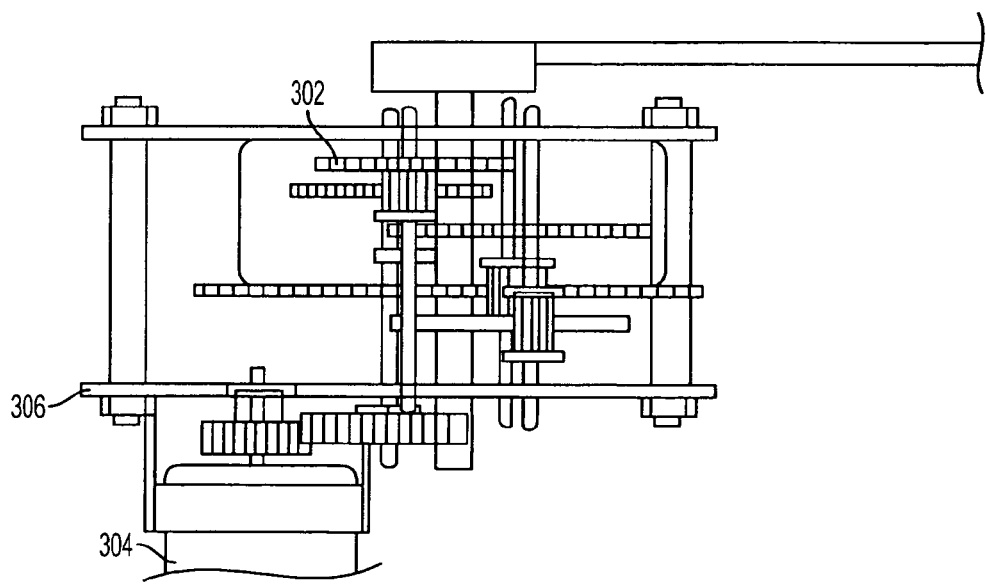
FIG. 25 is a top plan view of the manual-powered generator of FIG. 24.

FIGS. 20-22 show another embodiment of a manual-powered generator device 200 with a fourth transfer gear 202. The manual-powered generator device 200 of FIG. 20 is similar in other respects to the manual-powered generator device 52 of FIG. 1. FIGS. 23-25 show yet another embodiment of the manual-powered generator device 300 with a fourth transfer gear 302 and wherein the generator 304 is mounted on the exterior of the frame 306. The manual-powered generator device 300 of FIG. 23 is similar in other respects to the manual-powered generator device 52 of FIG. 1.

In yet other embodiments of the manual-actuated generator, a biasing mechanism can be provided that urges the operator handle to move in a return direction toward a return position. In use, the operator can move the operator handle in the operating direction to generate electricity. At the end of the stroke, the operator can stop applying force to the handle such that the biasing mechanism urges the operating handle to move in the return direction toward the return position such that the handle is ready to be moved again in the operating direction to continue to generate electricity.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A manually-powered electrical assembly comprising:
an electrical device;
an electrical generator, the electrical generator electrically connected to the electrical device, the electrical generator operable to provide an electric current to the electrical device to operate the electrical device, the electrical generator having a rotor;
a manual actuator assembly arranged with the electrical generator for selectively manually operating the electrical generator, the manual actuator assembly including an operator handle movable over a range of travel between a normal position and an operated position, a spring assembly connected to the operator handle, and a drive train connected to the spring assembly and the electrical generator for rotating the rotor of the electrical generator, the operator handle having a rotatably movable shaft, the spring assembly having a reel mounted to the shaft of the operator handle and a tape spring for rotationally biasing the reel to rotate in a return direction, the tape spring wound on the reel and connected such that when the operator handle is moved in an operating direction toward the operated position, the reel rotates in a forward direction and the tape spring develops a return force, the return force urging the reel and the shaft of the operating handle to move in a return direction, the return direction opposing the forward direction, and the drive train including a plurality of gears, one gear of the drive train being mounted to the shaft of the operating handle and another gear being mounted to the rotor of the electrical generator.

2. The electrical assembly of claim 1, wherein the electrical device is a light source.

3. The electrical assembly of claim 1, wherein the electrical device is a fan.

4. The electrical assembly of claim 1, wherein the electrical device is a mobile telephone.

5. The electrical assembly of claim 1, wherein the drive train of the manual actuator assembly includes at least three transfer gears.

6. The electrical assembly of claim 1, wherein the drive train of the manual actuator assembly includes at least four transfer gears.

7. The electrical assembly of claim 1, wherein the manual actuator assembly includes a handle pawl mechanism.

8. The electrical assembly of claim 1, wherein the manual actuator assembly includes a spring pawl mechanism.

9. The electrical assembly of claim 7, wherein the handle pawl mechanism includes a handle pawl and a ratchet gear.

10. The electrical assembly of claim 9, wherein the handle pawl and the ratchet gear are configured such that, when the operator handle is moved in the operating direction, the handle pawl engages the ratchet gear to thereby rotate the shaft, and, when the operator handle is moved in the return direction, the handle pawl disengages from the ratchet gear, and the operating lever rotates with respect to the shaft such that the operating lever moves in the return direction without rotation of the shaft.

* * * * *